US009268857B2

(12) United States Patent
Johnson et al.

(10) Patent No.: US 9,268,857 B2
(45) Date of Patent: Feb. 23, 2016

(54) SUGGESTING SEARCH RESULTS TO USERS BEFORE RECEIVING ANY SEARCH QUERY FROM THE USERS

(75) Inventors: Michael Dudley Johnson, San Francisco, CA (US); Ryan Patterson, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 315 days.

(21) Appl. No.: 13/191,307

(22) Filed: Jul. 26, 2011

(65) Prior Publication Data

US 2012/0310922 A1 Dec. 6, 2012

Related U.S. Application Data

(63) Continuation-in-part of application No. 13/152,664, filed on Jun. 3, 2011, now Pat. No. 9,110,992.

(51) Int. Cl.
*G06F 7/00* (2006.01)
*G06F 17/30* (2006.01)

(52) U.S. Cl.
CPC ................. *G06F 17/30867* (2013.01)

(58) Field of Classification Search
CPC .............. G06F 17/30; G06F 17/30864; G06F 17/30867; G06F 17/3053
See application file for complete search history.

(56) References Cited

U.S. PATENT DOCUMENTS

| | | | |
|---|---|---|---|
| 7,680,781 B1 | 3/2010 | Wasserman | |
| 7,720,833 B1 * | 5/2010 | Wen et al. | 707/706 |
| 8,095,582 B2 * | 1/2012 | Cramer | 707/705 |
| 8,301,639 B1 * | 10/2012 | Myllymaki et al. | 707/748 |
| 8,909,637 B2 | 12/2014 | Patterson | |
| 2006/0235873 A1 | 10/2006 | Thomas | |
| 2006/0259861 A1 * | 11/2006 | Watson | 715/705 |
| 2008/0005072 A1 | 1/2008 | Meek et al. | |
| 2008/0072180 A1 | 3/2008 | Chevalier et al. | |
| 2008/0183695 A1 | 7/2008 | Jadhav | |
| 2008/0235111 A1 | 9/2008 | Dotan et al. | |
| 2009/0271374 A1 | 10/2009 | Korn et al. | |
| 2009/0281988 A1 | 11/2009 | Yoo | |
| 2009/0307205 A1 | 12/2009 | Churchill et al. | |
| 2009/0327520 A1 | 12/2009 | Lee et al. | |
| 2010/0106703 A1 * | 4/2010 | Cramer | 707/706 |
| 2010/0223257 A1 * | 9/2010 | Milic-Frayling et al. | 707/722 |
| 2011/0022602 A1 | 1/2011 | Luo | |
| 2011/0055189 A1 * | 3/2011 | Effrat et al. | 707/706 |
| 2011/0131241 A1 | 6/2011 | Petrou et al. | |

(Continued)

FOREIGN PATENT DOCUMENTS

| | | | |
|---|---|---|---|
| JP | 2008-243008 A | 10/2008 | |
| JP | 2009-509275 A | 3/2009 | |

(Continued)

OTHER PUBLICATIONS

International Search Report and Written Opinion for International Application No. PCT/US2012/045888, Dec. 18, 2012.

(Continued)

*Primary Examiner* — Azam Cheema
(74) *Attorney, Agent, or Firm* — Baker Botts L.L.P.

(57) ABSTRACT

In one embodiment, in response to a user accessing a search tool and before the user submitting any search query or portion thereof to the search tool, compiling a first set of search results based on information known about the user and presenting the first set of search results to the user.

19 Claims, 4 Drawing Sheets

(56) References Cited

U.S. PATENT DOCUMENTS

| | | | |
|---|---|---|---|
| 2011/0201320 A1* | 8/2011 | Wosk et al. | 455/415 |
| 2011/0264648 A1 | 10/2011 | Gulik et al. | |
| 2011/0264681 A1* | 10/2011 | Kimberlin et al. | 707/767 |
| 2011/0276396 A1* | 11/2011 | Rathod | 705/14.49 |
| 2011/0312423 A1 | 12/2011 | Mosites et al. | |
| 2011/0320423 A1 | 12/2011 | Gemmell et al. | |
| 2011/0320441 A1 | 12/2011 | Lee | |
| 2012/0036454 A1 | 2/2012 | Cole et al. | |
| 2012/0110032 A1 | 5/2012 | Robison et al. | |
| 2012/0185472 A1 | 7/2012 | Ahmed | |
| 2012/0304079 A1 | 11/2012 | Rideout et al. | |

FOREIGN PATENT DOCUMENTS

| | | |
|---|---|---|
| JP | 2010-086150 A | 4/2010 |
| JP | 2010-128849 A | 6/2010 |
| KR | 10-2011-0032878 | 3/2011 |

OTHER PUBLICATIONS

Patterson et al., "Context-Based Ranking of Search Results," U.S. Appl. No. 13/152,614, 36 pages, Jun. 3, 2011.
Johnson et al., "Context-Based Selection of Calls-To-Action Associated with Search Results," U.S. Appl. No. 13/152,664, 45 pages, Jun. 3, 2011.
PCT, Notification of Transmittal of the International Search Report and the Written Opinion of the International Searching Authority, or the Declaration, re: PCT/US2012/040160, International filing date: May 31, 2012, 9 pages, Mailing Date: Jan. 31, 2013.
Examination Report for MX Application No. MX/a/2013/014211 (with English translation), Apr. 8, 2015.
European Patent Office Search Report for Application 12792344.9—1952, Jan. 21, 2015.
U.S. Appl. No. 13/152,614, filed Jun. 3, 2011, Patterson.
U.S. Appl. No. 13/152,664, filed Jun 3, 2011, Johnson.
U.S. Appl. No. 14/526,694, filed Oct. 29, 2014, Patterson.
U.S. Appl. No. 14/715,364, filed May 18, 2015, Johnson.
PCT Notification of Transmittal of the International Search Report and the Written Opinion of the International Searching Authority, or the Declaration for PCT/US2012/040160, Jan. 31, 2013.
Office Action of the Canadian Intellectual Property Office for Application No. 2,837,507, Apr. 8, 2015.
Korean Intellectual Property Office Notice of Preliminary Rejection for Application No. 10-2013-7033941 (with translation), May 21, 2015.
Japanese Patent Office Notification of Reasons for Rejection of Application 2014/513686 (with translation), May 26, 2015.

* cited by examiner

SUGGESTING SEARCH RESULTS TO USERS BEFORE RECEIVING ANY SEARCH QUERY FROM THE USERS

CROSS REFERENCE TO RELATED APPLICATION(S)

This application is a continuation-in-part of co-pending U.S. patent application Ser. No. 13/152,664, filed on 3 Jun. 2011, entitled "Context-Based Selection of Calls-To-Action Associated with Search Results", by Johnson et al.

TECHNICAL FIELD

This disclosure generally relates to improving search experiences for Internet users.

BACKGROUND

The Internet provides a vast amount of information, which may be stored at many different sites and on many different devices, such as on servers and clients or in databases, around the world. These different devices at the different sites are communicatively linked to computer or communication networks over wire-line or wireless connections. A person may access specific pieces of information available on the Internet using a suitable network device (e.g., a computer, a smart mobile telephone, an entertainment console, etc.) connected to a network.

Due to the sheer amount of information available on the Internet, it is impractical as well as impossible for a person (e.g., a network user) to manually search throughout the Internet for the specific pieces of information he needs. Instead, most network users rely on different types of computer-implemented tools to help them locate the desired information. One of the most commonly and widely used computer-implemented tools is a search tool, also referred to as a search engine. To search for information relating to a specific topic on the Internet, a user typically provides a few words, often referred to as a "search query" or simply "query", describing the topic to a search tool. The search tool conducts a search based on the search query using various search algorithms and generates a set of search results, each corresponding to some information that is most likely to be related to the search query. The search results are then presented to the user.

Sophisticated search tools implement many other functionalities in addition to merely identifying the search results as a part of the search process. For example, a search tool usually ranks the identified search results according to their relative degrees of relevance with respect to the search query, such that the search results that are relatively more relevant to the search query are ranked higher than and consequently are presented to the network user before the search results that are relatively less relevant to the search query. Sometimes, a search result may be associated with a clickable call-to-action icon or button so that the user may click on it to further interact with the search result. There are continuous efforts to improve the quality of the search results generated by the search tools.

SUMMARY

This disclosure generally relates to improving search experiences for Internet users. More specifically, in particular embodiments, when a user accesses a user interface provided by a computer-implemented search tool in order to conduct a search, before the user enters anything (e.g., any search query) into the input field included in the user interface, a set of search results is compiled and presented to the user (e.g., as suggestions). Thereafter, the user has the choice of: (1) interacting with any of the suggested search results; or (2) entering a search query, which causes another set of search results to be compiled in response to the search query and presented to the user.

In particular embodiments, in response to a user accessing a search tool and before the user submitting any search query or portion thereof to the search tool, compiling a first set of search results based on information known about the user and presenting the first set of search results to the user.

These and other features, aspects, and advantages of the disclosure are described in more detail below in the detailed description and in conjunction with the following figures.

DESCRIPTION OF EXAMPLE EMBODIMENTS

Figure 2A:
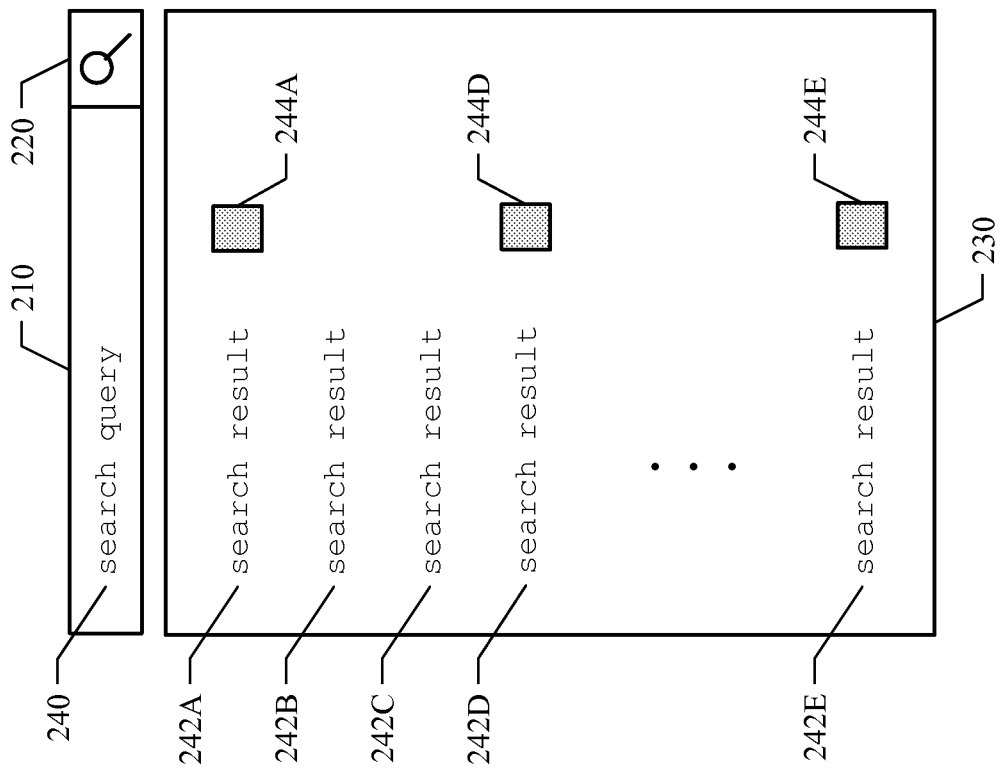
FIG. 2A illustrates an example user interface through which a user may search for information.

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A computer-implemented search tool is designed to search for information relevant to specific topics on one or more networks, such as the Internet or an Intranet. To conduct a search, a network user may issue a search query to the search tool. The search query generally contains one or more words that describe a topic. In response, the search tool may identify a set of search results, each corresponding to some information that is likely to be related to the search query. The set of search results may be ranked based on any number of factors and presented to the user according to their respective ranks.

When ranking a set of search results with respect to a search query, many different factors may be considered. For example, the content of each search result may be analyzed to determine its degree of relevance to the search query. In addition, particular embodiments may rank the search results based on factors such as, for example and without limitation, the context in which the search is being conducted, the nature or characteristics of the topic described by the search query, the time when and the location where the search is requested, and the social-networking information and the behavior profile of the user requesting the search.

Particular embodiments may also boost the ranks of certain search results according to objectives such as, for example and without limitation, the business strategies or goals of the entity providing the search tool. In particular embodiments, the search tool may be provided by or associated with a social-networking system. The social-networking system may have any number of features, such as, for example and without limitation, enabling its users to contact their friends via emails or messages, organize events, form social groups, upload and share photos, read news feeds, use various web-based applications (e.g., provided either by the social-networking system or third parties), play online games, and so on. In particular embodiments, one or more search results in the set may be associated with such a feature. When ranking the set of search results, the level of interaction the user has with the feature may be taken into consideration. In some cases, the respective ranks of the search results associated with the feature may be boosted (i.e., artificially increased) in order to bring the feature to the user's attention in the hopes that the level of interaction the user has with the feature may be increased.

In particular embodiments, one or more search results in the set may be associated with various call-to-action elements. The term "call to action", in the context of network content and more specifically, in the context of user experience, is a user-interface element that prompts an action from a user to initiate some function or process, such as initiating a call or other communication. The most popular manifestation of call to action in web-based interfaces is in the form of clickable icons or buttons, which, when clicked, perform specific actions or lead to specific network content. In particular embodiments, a search result may be associated with a call-to-action element (e.g., an icon or button) so that a user may click on it to further interact with the search result. Sometimes, multiple types of call-to-action elements may be appropriately associated with a specific search result. Particular embodiments may select one of the call-to-action elements for the search result based on various factors, such as, for example and without limitation, the context in which the search is being conducted, the nature or characteristics of the topic described by the search query, the content of the search result, the time when and the location where the search is requested, the social-networking information and the behavior profile of the user requesting the search, and the business strategies or objectives of the entity (i.e., the social-networking system) providing the search tool.

In particular embodiments, one or more search results may be suggested to a user as soon as the user accesses the search tool and before the user has entered any search query or portion thereof. These search results may be compiled and/or ranked based on a number of factors, such as, for example and without limitation, the fact that the user has accessed the search tool indicates that the user intends to search for some information, the identify of the user, the profile and social information about the user, behavior patterns of the user, past actions taken by the user, the time when the user accesses the search tool, the location of the user where the user accesses the search tool, etc. In particular embodiments, these may be used to construct a model for the user, which may then be used to determine how the suggested search results may be compiled and ranked for the user each time the user accesses the search tool.

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, organize events, etc.

A social-networking system may contain a vast amount of information related to its users. Such information is not limited to the social connections of the individual users, but may include, for example and without limitation, demographical information, network or social activities, behavior profiles, and personal preferences, interests, or hobbies of the individual users. Particular embodiments may represent the information contained in a social-networking system using a graph that may have any number of nodes and edges, an example of which is illustrated in FIG. 1.

Figure 1:
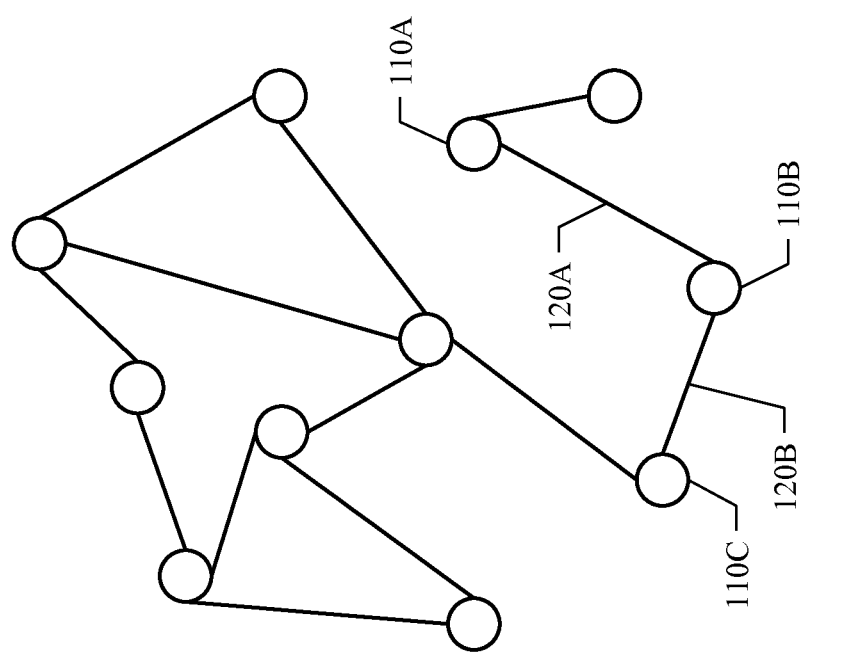
FIG. 1 illustrates an example graph that represents the information contained in a social-networking system.

In graph 100 illustrated in FIG. 1, each node may represent an entity, which may be human (e.g., user of the social-networking system) or non-human (e.g., location, event, action, business, object, message, post, image, web page, news feed, etc.). Two nodes are connected with an edge if the two nodes are related in some way (i.e., there is a relationship between the two nodes). Example cases when two nodes in graph 100 may be related and thus connected with an edge may include, without limitation, (1) the two nodes represent two users of a social-networking system respectively, and the two users are socially connected (e.g., friends of each other); (2) the two nodes represent a user of the social-networking system and an event respectively, and the user has attended the event; (3) the two nodes represent a user of the social-networking system and a location, and the user has been to the location; (4) the two nodes represent a user of the social-networking system and the user has interacted with (e.g., viewed) the web page; (5) the two nodes represent an event and a location respectively, and the event is held at the location; (6) the two nodes represent a user of the social-networking system and an image (e.g., a digital photograph) respectively, and the user is in the image; (7) the two nodes represent a user of the social-networking system and a product (e.g., a mobile telephone) respectively, and the user owns and uses the product; and (8) the two nodes represent a user of the social-networking system and a software application (e.g., a web-based game) respectively, and the user uses the application (e.g., plays the game). A connection may exist between two humans, a human and a non-human entity, and two non-human entities. Any type of relationship between two human or non-human entities may result in a connection between the two entities.

In graph 100, when there is an edge between two specific nodes, the two nodes may be considered directly related. For example, edge 120A connects nodes 110A and 110B, and thus nodes 110A and 110B are directly related. Similarly, edge 120B connects nodes 110B and 110C, and thus nodes 110B and 110C are directly related. When there is no edge between two particular nodes, the two nodes may still be considered indirectly related. For example, there is no edge directly connecting nodes 110A and 110C; however, nodes 110A and 110C may still be considered indirectly related through node 110B.

With respect to node 110A, node 110B has a closer relationship to it than node 110C, because in graph 100, it takes one hop to go from node 110A to node 110B, but it takes two hops to go from node 110A to node 110C (i.e., through node 110B). In particular embodiments, with respect to two specific nodes, the less number of hops it takes to go from one node to another node, the closer the two nodes are related.

In particular embodiments, a social-networking website implementing a social-networking system may provide a search tool that enables its users to search for information relating to specific topics in the social context. The information represented by a graph, such as the one illustrated in FIG. 1, may be used to help identify and rank the search results. FIG. 2A illustrates an example user interface 200 through which a user may provide search queries and receive search results. In this case, there is an input field 210 through which a user may provide search queries (e.g., search query 240), an icon 220 through which the user may submit the search queries (e.g., by clicking on icon 220), and an output field 230 where the search results (e.g., search results 242A-E) may be displayed. In addition, sometimes, a search result may be associated with a call-to-action element. For example, in FIG. 2A, search result 242A is associated with call-to-action icon 244A; search result 242D is associated with call-to-action icon 244D; and search result 242E is associated with call-to-action icon 244E. Note that it is not necessary that each and every search result in a set is associated with a call-to-action element. For example, in FIG. 2A, search results 242B and 242C are not associated with any call-to-action elements. Call-to-action icons 244A, 244D, and 244E may be clickable icons. If a user clicks on one of these call-to-action icons, the user may further interact with the associated search result or an action may be performed in connection with the associated search result. In particular embodiments, a call-to-action element may be presented in close proximity to its associated search result.

In particular embodiments, multiple call-to-action elements may be associated with the same search result. For example, if the search result is an email message, then the call-to-action elements associated with the email message search result may include "reply", "forward", and "delete". If the search result is a restaurant, then the call-to-action elements associated with the restaurant search result may include "check-in", "like", and "make reservation". Some search results may be personally or professionally related to the user requesting the search (e.g., search results that are personal or professional contacts obtained from the user's address book). If the search result is a friend of the user's, the call-to-action elements may include "make phone call", "send email", "send SMS", "start chart session", "post to wall", etc. As these examples illustrate, what call-to-action elements are suitable for a particular search result may depend on the nature of the search result itself.

Figures 2B, 2C:
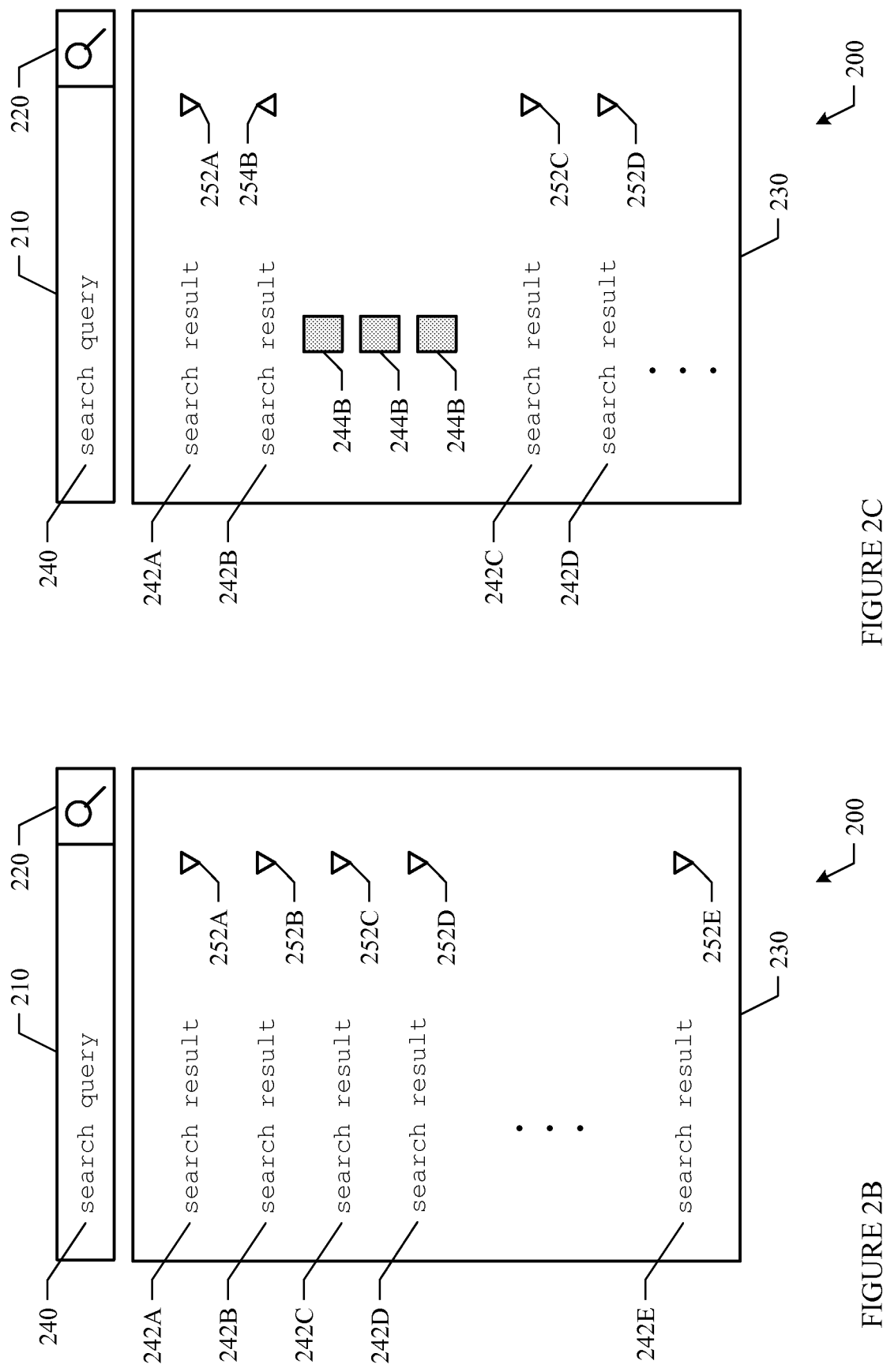
FIGS. 2B-2C illustrates an example user interface where a search result is associated with various call-to-action elements.

In particular embodiments, each search result 242 may be associated with an expansion icon 252 (e.g., a downward triangle), as illustrated in FIG. 2B. When the user clicks on an expansion icon 252, the call-to-action elements associated with the corresponding search result 242 are displayed. Suppose that the user clicks on expansion icon 252B. In FIG. 2C, three call-to-action elements 244B associated with search result 242B are displayed. In addition, expansion icon 252B, associated with search result 242B, is replaced with a contraction icon 254B (e.g., an upward triangle). When the user clicks on a contraction icon, the call-to-action elements associated with the corresponding search result 242 are hidden.

In particular embodiments, a user interface, such as the one illustrated in FIGS. 2A-2C, may be incorporated in a web page or a window panel for display on the screen of an electronic device. For example, interface 200 may be displayed on the screen of a mobile telephone or tablet.

In particular embodiments, the search tool may implement the "type ahead" feature, also known as "incremental search", "incremental find", or "real-time suggestions", which is a user interface interaction method to progressively search for and filter through texts (e.g., search queries). As a user types the text of a search query, one or more possible matches for the text are found and immediately presented to the user. This immediate feedback often allows the user to stop short of typing the entire word or phrase of the search query. The user may also choose a closely related option from the presented list. In addition, in particular embodiments, as the user types each character of a search query, a set of search results corresponding to the text thus far typed may be presented to the user immediately. The search results may be updated each time the user further types a character.

For example, suppose that a user wants to search for a person, and begins to input the person's name as the search query. The user first types the character "j" (e.g., in an input field included in a user interface). At this point, some of the names that begin with the letter "j" (e.g., Jane, John, Joseph, Judith, etc.) may be suggested to the user. In addition, a set of search results corresponding to one or more of the suggested names (e.g., the first suggested name, Jane, or several of the suggested names, Jane, John, Joseph, etc.) may be presented to the user as well. Suppose that the user next types in the character "o". At this point, some of the names that begin with the letters "jo" (e.g., Joan, John, Jordon, Joseph, Joshua, etc.) may be suggested to the user. In addition, a set of search results corresponding to one or more of the suggested names (e.g., Joan, or Joan, John, etc.) may be presented to the user as well. This process may continue until the user finishes typing the name or selects one of the suggested names or search results. Type ahead is described in more detail in U.S. patent application Ser. No. 12/816,377, entitled "Search and Retrieval of Objects in a Social Networking System", filed on 15 Jun. 2010, which is hereby incorporated by reference in its entirety and for all purposes.

When typing search terms, the user can occasionally enter wrong characters as part of the search phrase. Using past knowledge of the particular user's search queries, general user search queries, the layout of the current keyboard on the device, and a definition of the language or languages the user is likely to be typing in, allows the search provider to "guess" the likely search phrase even when an incorrect character has been entered. For example, the character "o" on a standard US QWERTY keyboard is most closely surrounded by the characters "o", "p", ";", ",", and "k". If a user types "j", then the set of results for all 2-letter combinations other than "jo" are unlikely to be the user's intended search query. If results exist for "jl", they can be displayed. If no such results exist, then the results for "jo" can be displayed to the user, with an indicator that an auto-correction has temporarily been applied. This reduces the need for the user to correct the search query before tapping on the search result.

Note that in the example user interface 200 illustrated in FIGS. 2A-2C, an icon 220 is illustrated for submitting the search queries. This icon is not necessary in all cases. For example, when the "type ahead" feature is supported, icon 220 may not be needed and included in a search-related user interface.

When a search tool receives a search query from a user, it may identify a set of search results considered relevant to the search query. In addition, the set of search results may be ranked based on various factors, objectives, and other considerations. The search results that are ranked higher are presented to the user before the search results that are ranked lower. Achieving a good ranking of the search results for a user is especially desirable in some cases. For example, often, a user may conduct searches using a mobile electronic device (e.g., a mobile telephone or a tablet computer) that has a relatively small display screen. Consequently, not many search results may be displayed and presented to the user within one screen. To avoid having to make the user scroll down multiple screens to locate the specific search results he is looking for, if these search results are ranked higher and presented to the user first, it can save the user time and make the search experience more efficient and pleasant for the user.

In some cases, certain search results may be associated with various call-to-action elements. Similarly, given a specific search result, it may be desirable to select an appropriate call-to-action element (e.g., icon or button) to be associated with the search result so that the user may conveniently select the call-to-action element, which is often presented in close proximity to the associated search result, to perform an action with respect to the search result. Again, a user may conduct searches using a device (e.g., a mobile device) where it may not be easy and fast to navigate among the different user-interface elements. To avoid having to make the user perform several interactions with the device in order to initiate the desired action with respect to a search result, if the appropriate call-to-action element is presented near the associated search result, the user may easily select that call-to-action element to initiate the desired action with respect to a search result.

In particular embodiments, the user may be a user of the social-networking system providing or associated with the search tool. When compiling and ranking the set of search results in response to a search query, the search tool may examine and analyze any relevant information available to the social-networking system and thus to the search tool (i.e., not just limited to web pages or other types of contents available on the Internet). For example and without limitation, the search tool may consider: (1) the nature and the context (especially the social context) of the search query (e.g., whether the search query refers to a person, a location, an event, a place, a software or web application, an object, etc.); (2) the social and demographical information of the user requesting the search (e.g., the user's social connections, age, gender, family status, etc.); (3) the behavior profile or activities of the user (e.g., the user's daily routines, hobbies, interests, past network or social activities, etc.); (4) the time when and the location where the user provides the search query; (5) whether the social-networking system desires to promote certain search results (e.g., search results associated with a feature of the social-networking system, which the social-networking system desires to bring to the user's attention); (6) whether the social-networking systems desires to train or guide the user toward certain search results or behaviors; (7) the historical behavior of the user in using this or other search tools previously, such as whether the user typically selects or fails to select certain classes of or certain particular results; (8) the historical behavior of the user in certain locations (e.g., the user always selects results referring to people while at home, but selects results referring to businesses while not at home); and (9) the historical behavior of the user with respect to whether the user responds to the search results after selecting one (e.g., by commenting or liking on the result that is delivered). In addition, in particular embodiments, the search tool may examine and analyze information stored on the electronic device used by the user to request the search, and may include some of such information in the search results (e.g., if such information is considered relevant to the search query).

Figures 3, 4:
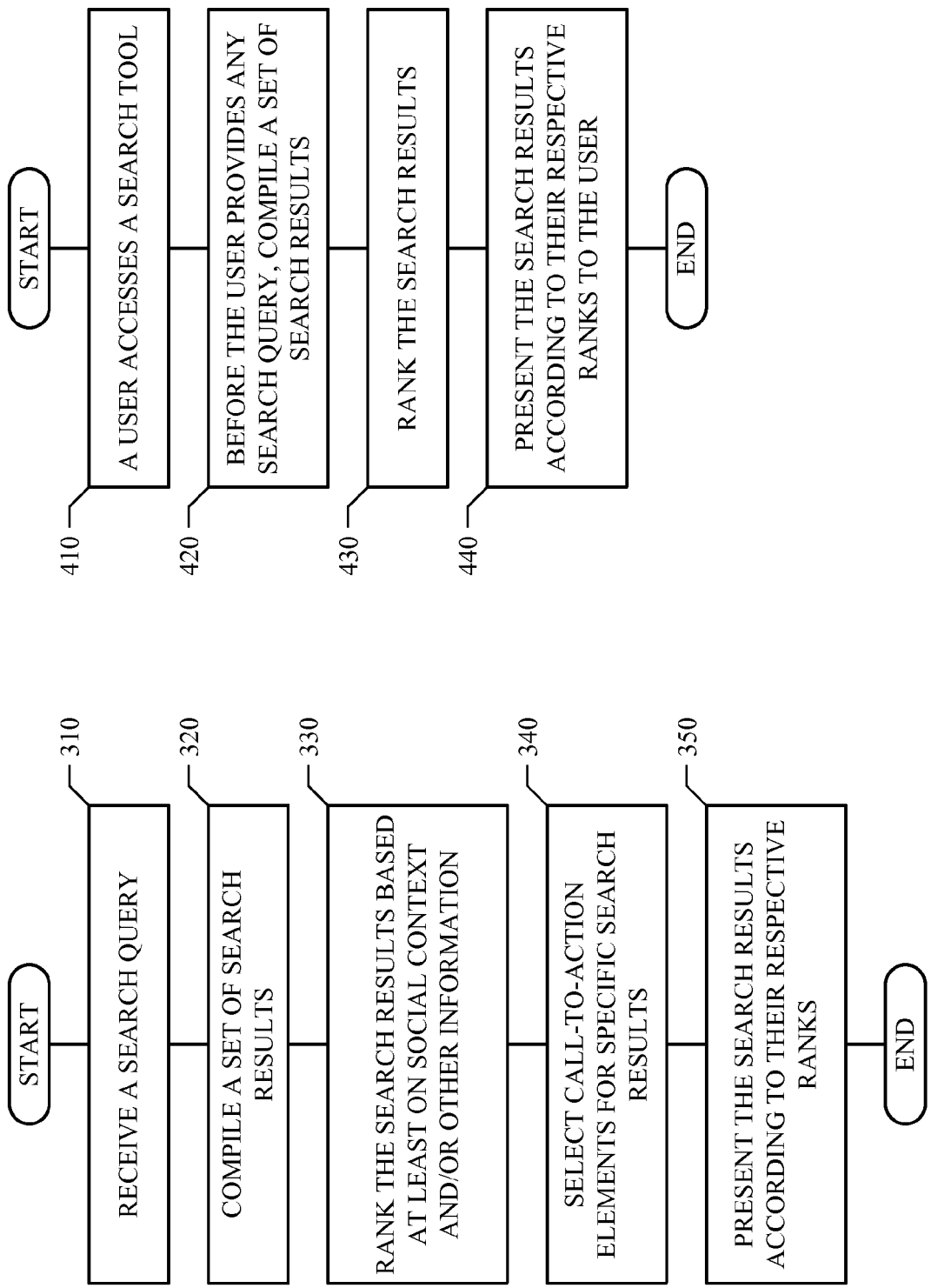
FIG. 3 illustrates an example method for constructing a set of search results in response to a search query.
FIG. 4 illustrates an example method for suggesting a set of search results to a user before the user has provided any search query or portion thereof.

FIG. 3 illustrates an example method of constructing a set of search results in response to a search query while taking into consideration at least some of the social information relevant to the user requesting the search. As described above in connection with FIG. 1, the information available in a social-networking system may be represented by a graph (e.g., graph 100 illustrated in FIG. 1). Such a graph may be used when compiling and ranking a specific set of search results for a specific user, as well as when selecting call-to-action elements for specific search results. In particular embodiments, since the user requesting the search is a user of the social-networking system, one of the nodes in the graph associated with the social-networking system may represent the user. By analyzing the graph, the search tool may determine what other human and non-human entities are directly or indirectly related to the user (e.g., other nodes in the graph that are connected, directly or indirectly, to the node representing the user), the types of these relationships (e.g., what relationships the edges represent), and how closely the other nodes are related to the node representing the user (e.g., the number of hops between each pair of nodes).

Particular embodiments may receive a search query from a user, as illustrated in STEP 310. The user may be a user of the social-networking system and may provide the search query through an electronic device (e.g., a mobile telephone or tablet) connected to a network. For example, suppose that the search query is the word "Johnson".

Particular embodiments may identify and compile a set of search results in response to the search query, as illustrated in STEP 320. The search results may include any type of information or content. For example, the word "Johnson" may refer to a person (e.g., Mary Johnson), a location (e.g., Johnson City), an establishment (e.g., Johnson's Hardware Store, or Johnson BBQ Restaurant), a brand or product name (e.g., Johnson & Johnson), a news story (e.g., a news feed about Jimmie Johnson), and a message (e.g., a post by or concerning Tom Johnson). The search results may be a mixture of many types of information considered relevant to the search query.

When selecting the search results, particular embodiments may obtain information from various sources, such as, for example and without limitation, information stored locally on the electronic device used by the user, information stored on servers or in databases associated with the social-networking system, and information publically available on the Internet. For example, the contact information of a person named "Mary Johnson" may be stored locally on the user's electronic device. Thus, the name and contact information (e.g., email address or phone number) of Mary Johnson may be selected as one of the search results included in the set. In this case, the search result comes from the information stored on the electronic device used by the user when conducting the search. As another example, from the user's account at the social-networking website, it may be determined that the user has visited a restaurant called "Johnson BBQ Restaurant" several times in the past (e.g., the user has "checked in" with the social-networking system when at Johnson BBQ Restaurant). Thus, the name and address of Johnson BBQ Restaurant may be selected as one of the search results included in the set. In this case, the search result comes from the information stored on servers or in databases associated with the social-networking system. As another example, there may be news stories on the Internet about Jimmie Johnson participating in a NASCAR race. Thus, a web page containing such a news story may be selected as one of the search results included in the set. In this case, the search result comes from the information publically available on the Internet.

When the user submits the search query to initiate the search process, since the search results may be obtained from various sources, some specific search results may become available before others. For example, search results obtained from information stored locally on the electronic device used by the user may be readily available, before search results obtained from information associated with the social-networking system or on the Internet, which may take a slightly longer time to obtain since they are stored at remote sites. In particular embodiments, as soon as some search results become available, they may be presented to the user immediately, instead of having to wait for other search results to become available. For example, in the above scenario, the contact information for "Mary Johnson" is stored locally on the user's electronic device and thus may be readily available. Upon the user submitting the search query "Johnson", the contact information for "Mary Johnson" may be presented to the user immediately. Then, as more search results become available (e.g., obtained from the social-networking system or the Internet, such as the address and phone number of "Johnson BBQ Restaurant"), they may be added to the set of search results compiled for the search query "Johnson" and presented to the user accordingly (e.g., upon their availability).

A social-networking system may implement and support any number of features. In particular embodiments, one or more of the search results selected in response to the search query may be associated with one or more of such features. In some cases, it may be possible that a search result not highly relevant to the search query may nevertheless be selected and included as one of the search results for the search query. For example, one feature may be that a user may play online games through the social-networking website. One of the available games called "Hatchlings" may be selected as one of the search results for search query "Johnson", even though this game has little or no apparent relevance to the word "Johnson".

Particular embodiments may rank the set of search results based at least on the social context or information relevant to the user requesting the search, as illustrated in STEP 330. Existing search engines (e.g., search engines provided by Google, Microsoft, or Yahoo) rank search results based mainly on content relevance. They do not take into consideration of social context or information relevant to the specific user requesting the search because they are not provided by any social-networking system that possesses such social information. Instead or in addition to content relevance, particular embodiments may take into consideration of the social information available to the social-networking system providing or associated with the search tool as some of the factors when ranking the search results for the user. In a sense, the ranking is customized for each individual user based on the user's social information. In addition, in particular embodiments, the user's past behavior may be used to help identify and/or rank the search results.

For example, suppose that there are three people named "Johnson" found as users of the social-networking system. Without any social information of the user requesting the search, all three Johnsons may be similarly likely to be the person the user is searching for. In one case, suppose that based on the social information of the user, one of the Johnsons (e.g., Johnson #1) may be a friend of the user while the other two are not. In this case, Johnson #1 may be ranked higher than the other two Johnsons as it is more likely that the user is searching for his friend instead of some stranger. Furthermore, the other two Johnsons may not even be selected as search results for the user. In another case, suppose that two Johnsons (e.g., Johnson #1 and Johnson #2) are both friends of the user, but Johnson #1 is directly connected to the user (e.g., in the graph, there is an edge between the two nodes representing the user and Johnson #1 respectively) while Johnson #2 is indirectly connected to the user (e.g., connected through one or more other nodes based on the graph), or the user has contacted Johnson #1 more times or more frequently than Johnson #2. In this case, both Johnson #1 and Johnson #2 may be included in the set of search results, but Johnson #1 may be ranked higher than Johnson #2.

As another example, suppose that there are two businesses having the word "Johnson" in their names: Johnson's Hardware Store and Johnson BBQ Restaurant. The electronic device the user uses to conduct the search may supply location data (e.g., GPS data) that indicate the location of the device, and thus the location of the user, where the user requests the search on "Johnson". In one case, suppose that Johnson BBQ Restaurant is near the location of the user, while Johnson's Hardware Store is farther away. In this case, Johnson BBQ Restaurant may be ranked higher than Johnson's Hardware Store as it is more likely that the user is searching for a nearby business. In another case, suppose that the user has visited Johnson BBQ Restaurant in the past but has never been to Johnson's Hardware Store. In this case, Johnson BBQ Restaurant may also be ranked higher than Johnson's Hardware Store as it is more likely that the user is searching for a business with which he has some contact in the past.

As a third example, suppose that there are two events having the word "Johnson" in their descriptions: Johnson's birthday party and Johnson City counsel meeting. If the user has been invited to Johnson's birthday party and has responded affirmatively to the invitation, then Johnson's birthday party may be ranked higher than Johnson City counsel meeting. If the user does not live in Johnson City, then Johnson City counsel meeting may not be included in the search results at all, as Johnson City counsel meeting probably has no relation to the user. If Johnson's birthday party is scheduled for Saturday evening at 6:00 pm and the time the user requests the search is approximately Saturday at 5:00 pm, then again, Johnson's birthday party may be ranked higher, as it is more likely that, as the time when the user conducts the search is fairly close to the time of the event, the user is checking for information about the event in preparation of attendance.

As a fourth example, suppose that based on the user's profile, the user is interested in auto racing, or the user has posted messages about auto racing. In one case, a news story (e.g., a news feed) about Jimmie Johnson participating in a NASCAR race may be ranked higher as it is more likely that the user may be interested in such a story. In another case, suppose that there are multiple news feeds about Jimmie Johnson and auto racing, but some are older and some are newer. The more recent news feeds that are closer to the time when the user conducts the search may be ranked higher than the older news feeds as they are more likely to be of interest to the user than the older, and thus perhaps obsolete, news feeds.

As the above examples illustrate, when selecting and ranking a set of search results in response to a search query submitted by a user, any available information relevant to the user, to the search, or to the search query may be used. Such information may be stored at various sites, such as on the user's device, in association with the social-networking system, or publicly on the Internet. If some information is already available on the user's device, then it may not be necessary to obtain that information again from the social-networking system or on the Internet. In particular embodiments, the information contained in the social-networking system may be represented as a graph (e.g., as illustrated in FIG. 1), and such a graph may be used to compute, for each node in the graph, a coefficient that indicates its relationship to the node corresponding to the user requesting the search. This coefficient may be used to help rank the set of search results. In particular embodiments, each search result may correspond to a node in the graph as well.

In particular embodiments, a specific search result may be presented to the user as soon as it becomes available. As more search results become available, they may be added to and co-mingled with the existing search results and presented to the user as well. At the same time, the search results may be ranked and the higher-ranked search results should be presented to the user before the lower-ranked search results. However, a first search result that becomes available before a second search result is not necessarily ranked higher than the second search result. In particular embodiments, when ranking the search results, a ranking score may be computed for each search result, and the search results are ranked based on their respective ranking scores. In particular embodiments, as each search result becomes available, its ranking score may be computed. Between two search results, suppose that the first search result becomes available before the second search result; however, the ranking score of the first search result is lower than the ranking score of the second result, which means that based on their respective ranking scores, the second search result should be presented above the first search result on the display screen of the user's electronic device. By the time the second search result becomes available, the first search result may have already been presented to the user (i.e., displayed on the display screen of the user's electronic device). In particular embodiments, since the second search result is ranked higher than the first search result, when presenting the second search result to the user, the second search result is placed (e.g., inserted) above the first search result on the display screen of the user's electronic device, effectively "pushing" the first search result further down the display screen.

Optionally, particular embodiments may boost the respective ranks of one or more search results in the set so that they may be presented to the user before some other search results that would normally rank higher than them. There are different reasons for boosting the rank of a specific search result.

For example, the social-networking system providing the search tool may wish to achieve certain business objectives. Suppose that the user requesting the search only has a very few friends (e.g., less than 5 friends) identified in his account at the social-networking website. The social-networking system may desire to encourage such a user to have more friends. Suppose that the user is attending an event at a specific location when he conducts a search based on the query "Johnson". In one case, suppose that there are two Johnsons also attending the same event. Johnson #1 is the user's friend, while Johnson #2 is a stranger to the user. Normally, Johnson #1 would be ranked higher than Johnson #2, as it is more likely that the user is searching for his friend who is attending the same event as he is. However, to encourage the user to meet new friends, the rank of Johnson #2 may be booted to be above the rank of Johnson #1, and so, Johnson #2 is presented to the user before Johnson #1. As a result, the user may meet and become friends with Johnson #2 as well. In another case, suppose that a person named "Smith", who is a friend to the user's friend Johnson but is a stranger to the user, is also attending the same event. Normally, Smith may not be included in the set of search results compiled for the query "Johnson", or if Smith is included in the search results compiled for the query "Johnson", it may be ranked relatively low. However, to encourage the user to meet new friends, the rank of Smith may be boosted to be above the ranks of some other search results, and so is presented to the user fairly soon. As a result, the user may meet and become friends with Smith, especially considering they share a common friend.

As a second example, the social-networking system may wish to train the user about certain functionalities of features, or encourage certain user behaviors. In one case, suppose that the user requesting the search does not yet know he can play various online games through the social-networking website. When the user requests a search for the query "café", an online game named "Café Mystery" may be included in the search results with a boosted rank. When this game is presented to the user, the user may learn that he can play this game and many other games. Such type of boosting may be repeated for a number of times, until the user is familiar with the functionalities or acquired certain behavior patterns. Thereafter, it would no longer be necessary to boost the ranks of similar types of search results.

As a third example, suppose that the social-networking system recently has added a new feature to its website. To bring this new application to its users' attention, when a user requests a search, a search result relating to the new feature (e.g., a link pointing to the new feature) may be included as one of the search results. This may be determined based on whether a specific user has previously used the new feature. In one case, if the user requesting the search has already used the new feature, then the new feature may not need to be included in the search results, especially if the new feature has little or no relevance to the search query, as the user already knows about the new feature. On the other hand, if the user requesting the search has never interacted with the new feature thus far, then the new feature may be selected as one of the search results. Furthermore, the ranking of the new feature may be boosted so that it is presented to the user fairly soon to capture the user's attention.

In particular embodiments, given a set of search results compiled for a search query provided by a user, a ranking score may be computed for each search result in the set. In particular embodiments, the ranking score may be computed using an algorithm that takes into consideration of many factors (e.g., various factors as inputs to the algorithm), such as, for example and without limitation, the level of content relevance of the search result to the search query, the level of social relevance of the search result to the user requesting the search or the search query, the amount of boosting given to the search result, if any (e.g., determined based on business objectives), the degree of closeness in terms of time or location the search result has to the time when or location where the user requests the search, and so on. The algorithm may combine all available factors (i.e., inputs) to determine a final ranking score for each search result. In particular embodiments, the ranking score may be normalized to a number between 0 and 1.

In some cases, there may be one or more search results associated with a feature of the social-networking website included in the set. Given a specific feature, in particular embodiments, if the user has not interacted with the feature, then one or more search results associated with the feature may be included in the set. Furthermore, the ranking of these search results may be boosted (e.g., by providing a boosting factor to the ranking algorithm that increases the respective ranking scores of these search results) so that these search results are presented to the user sooner, in the hopes that the user may become aware of and subsequently use the feature. On the other hand, if the user has already interacted with the feature, then no special action in connection with the feature (e.g., selecting search results associated with the feature and boosting their ranking) may be needed.

Alternatively, in particular embodiments, given a specific feature, the amount or frequency of interaction the user has with the feature may be determined. For example, the level of interaction the user has with the feature may be represented as a number between 0 and 1. If the user has no interaction with the feature, the level of interaction may be 0. On the other hand, if the user uses the feature often, the level of interaction may be close to 1. When a user requests a search to be conducted on a given search query, whether to include one or more search results relating to the feature in the set of search results compiled for the search query and if so, how much to boost the ranking of these search results may depend on the current level of interaction the user has with the feature. For example, if the user has no or very low level of interaction with the feature, several search results relating to the feature may be included in the set and their rankings may be boosted much higher. As the user interacts with the feature more and more, and number of search results relating to the feature included in the set may gradually decrease and their rankings may only need to be boosted slightly. Finally, as the user interacts with the feature frequently, no search result relating to the feature needs to be included in the set.

In particular embodiments, a boosting coefficient (e.g., a number between 0 and 1) may be determined for each search result relating to the feature based on the current level of interaction the user has with the feature. This boosting coefficient may be supplied to the ranking algorithm as one of the inputs when computing the ranking score for each search result. For a search result not related to the feature, its boosting coefficient may be set to 0 (i.e., no boosting). For example, when the user has no or little interaction with the feature, the boosting coefficient may be close to 1. As the user interacts with the feature more and more, the boosting coefficient may gradually decreases. Finally, as the user interacts with the feature frequently, the boosting coefficient may be close to 0.

In particular embodiments, when including search results relating to a feature in a set of search results compiled for a search query, the user may be given an option to indicate that he is not interested in that feature. If the user has indicated that he is not interested in a specific feature, then for subsequent searches requested by this user, search results relating to the specific feature are not artificially selected as search results, especially when such search results have little or no relevance otherwise to the search queries provided by the user. Thus, once the user has indicated that he is not interested in a specific feature, even if the user has never interacted with the feature, search results relating to the feature are not artificially selected as search results, and when search results relating to the feature are selected as search results, their respective ranks are not artificially boosted.

In some cases, the user's past behavior, when available, may be used to help select and/or rank the search results, as well as determine which search results should have their ranks boosted. In particular embodiments, the user's behavior may be collected into a behavior profile, and the information contained in this profile may be used by the search tool as needed. For example, suppose that a user rarely or never selects (e.g., taps) on search results that are places. This may suggest that the user is not interested in place-type search results. In this case, to take into consideration the user's personal preference, when selecting search results for the user, the search tool may include very few or no place-type search results. Conversely, the system may wish to encourage the user to explore different types of search results in order to expand the user's interests. As a result, when selecting search results for the user, the search tool may include a larger number of place-type search results. Furthermore, the ranks of at least some of the place-type search results may be artificially boosted to bring them to the user's attention. Similar strategies may be applied with respect to a specific search result (e.g., the user never selects a specific search result).

As another example, suppose that the user only selects specific types of search results while at home, at work, or traveling. Thus, based on the user's current location, a larger number of those specific types of search results may be included, and if appropriate, the ranks of at least some of those types of search results may be boosted.

As a third example, the user may like to view (e.g., read) web pages associated with another specific person (e.g., that person's personal page or pages authored by that person, such as blogs), but due to various reasons, the user may not communicate directly to that person (e.g., reply or comment on the pages the user has read). The social-networking system associated with the search tool may have a business object to encourage its users not only to passively view information (e.g., content of web pages) but actively contribute information as well (e.g., by writing comments, replies, etc.). When the user views a web page, it is more likely that the user may be willing to further interact with that page or with the author of the page, since the user has already shown interest in the content of the page. In this case, for example, the ranking of the web page may be boosted.

Particular embodiments may select call-to-action elements for specific search results in the set, as illustrated in STEP 340. In some cases, each and every search result in the set may have an associated call-to-action element, while in other cases, only specific search results in the set may have associated call-to-action elements. Whether a search result has an associated call-to-action element, and if so, the specific type of call-to-action element may depend on many factors, and this disclosure contemplates any applicable factors. For example and without limitation, the factors may include the user's historical behaviors, the time when the search result is presented to the user, the location of the user device (and thus the user) where the search result is presented to the user, what the social-networking system associated with the search tool may encourage or desire the user to do with the search result, the information represented by the graph (e.g., graph 100 illustrated in FIG. 1) associated with the social-networking system, etc.

There are many types of call-to-action elements, such as, for example and without limitation, sending an email, making a telephone call, responding to a message, posting a comment, liking a search result, executing a web-based application, purchasing a product, viewing the content of a search result, and so on. In fact, any action that may be performed with respect to a search result may result in a corresponding call-to-action element. Thus, this disclosure contemplates any applicable type of call-to-action element.

Sometimes, a search result may only be associated with one type of suitable or applicable call-to-action element. In such cases, that type of call-to-action element is likely to be associated with the search result. However, more often, a search result may be associated with multiple types of call-to-action elements. In such cases, one specific type of callto-action element may be selected for and associated with the search result. What specific types of call-to-action elements are suitable or applicable to a particular search result may depend on the nature or content of the search result itself.

Given a search result that may be associated with multiple call-to-action elements, particular embodiments may select one or more call-to-action elements that are considered most suitable or preferred for the user at the time the search result, together with the call-to-action element(s), is presented to the user. Note that different call-to-action elements may be considered suitable for different users or at different times. In particular embodiments, for a given search result, a set of call-to-action elements suitable or applicable to the search result may be compiled based on available information. The call-to-action elements may then be ranked based on the various factors (e.g., the factors described above). In other words, to determine the appropriate call-to-action element(s) for a search result, particular embodiments may conduct a search (i.e., a second search for call-to-action elements in response to the search result) to compile a set of suitable call-to-action elements for the search result, and then rank the call-to-action elements in the set. The top-ranked call-to-action element or elements may then be associated with the search result. In particular embodiments, the ranking of the call-to-action elements may indicate the degrees of suitability of the individual call-to-action elements to the search result, taking into consideration, for example, the user requesting the search, the time when and/or location where the search is request, the context of the search, etc.

In particular embodiments, when selecting and/or ranking the call-to-action elements for the search results, the information represented by the graph associated with the social-networking system (e.g., graph 100 illustrated in FIG. 1) may be used. As described above, since the user is a member of the social-networking system, one of the nodes in the graph may correspond to the user. In addition, a search result may also correspond to a specific node in the graph. Thus, the relationship or relationships between the user and the search result may be determined by examining how the two nodes corresponding to the user and the search result, respectively, may be related (e.g., directly or indirectly) in the graph.

For example, suppose that a search result identified for the search query "Johnson" is "Mary Johnson", who is a friend of the user requesting the search. Further suppose that Mary Johnson has several pieces of contact information available, including a home phone number, a work phone number, a mobile phone number, a fax number, an email address, and an instant message address. Thus, the call-to-action elements suitable for Mary Johnson may include "call home", "call work", "call mobile", "send fax", "send email", and "send instant message". These different call-to-action elements may be compiled into a set for Mary Johnson. To rank the call-to-action elements in the set, the user's past communication interactions with Mary Johnson may be analyzed. If the user most frequently calls Mary Johnson's mobile phone when contacting her, then the call-to-action element "call mobile" may be considered most suitable and selected to be associated with the search result "Mary Johnson". On the other hand, if the user most frequently sends Mary Johnson instant messages when contacting her, then the call-to-action element "send instant message" may be considered most suitable and selected to be associated with the search result "Mary Johnson". As this example illustrates, when ranking the set of call-to-action elements, the user's relationship with the search result "Mary Johnson" (i.e., social friends) as well as the user's past behavior pattern when interacting with the search result "Mary Johnson" may be relevant factors taking into consideration.

Alternatively, suppose that Mary Johnson is not a personal friend of the user's but a celebrity figure (e.g., an actress) whom the user is interested in. Because the relationship between the user and Mary Johnson is different from the above example, when Mary Johnson is identified as a search result for the search query "Johnson", the call-to-action elements suitable for the search result "Mary Johnson" may also differ. In this example, the user may not have Mary Johnson's contact information. Instead, the applicable call-to-action elements may include "read headline news about Mary Johnson", "buy tickets to Mary Johnson's latest movie", "view Mary Johnson's photos", "go to Mary Johnson's official website", and "join Mary Johnson fan club". If the user has often read news stories about Mary Johnson, then the call-to-action element "read headline news about Mary Johnson" may be considered the top-ranked call-to-action element and associated with the search result "Mary Johnson". On the other hand, if there is a new movie featuring Mary Johnson released on the day when the user requests the search, then the "buy tickets" call-to-action element may be ranked higher and associated with the search result "Mary Johnson". In this case, the time when the user requests the search may affect the ranking of the call-to-action elements.

In some cases, the objectives of the social-networking system associated with the search tool may affect the selection and/or ranking of the call-to-action elements. As a third example, suppose that the social-networking system wishes to promote a new web-based application sponsored by the social-networking system at its website. Thus, this web-based application may be included in the set of search results identified for the search query. In addition, the ranking of the web-based application may be boosted, as described above. The call-to-action element selected for and associated with the web-based application may be "launch application" so that the user may conveniently begin to use the web-based application by clicking on the "launch" call-to-action element displayed next to the web-based application. As this example illustrates, a call-to-action element's ranking may be artificially boosted, in a manner similar to boosting the ranking of a search result, as described above. In other words, sometimes, the provider of the search tool (e.g., the social-networking system) may prefer specific call-to-action elements (e.g., based on its business objectives) and thus may choose to boost the ranks of its preferred call-to-action elements over other call-to-action elements so that these call-to-action elements preferred by the service provider may be selected to be associated with the search results over the other call-to-action elements.

In some cases, the time when the search is conducted and/or the location where the user is when requesting the search may affect the selection and/or ranking of the call-to-action elements. For example, suppose that a search result is "Johnson BBQ Restaurant". Suitable call-to-action elements that may be associated with Johnson BBQ Restaurant may include "check in", "like", and "make reservation". If the user is currently at Johnson BBQ Restaurant (e.g., as indicated by the location data provided by the user's device) when the user requests the search, then "check in" may be selected to be associated with the search result, as it is likely that the user is attending a dinner party at the restaurant and wishes to check in. Of course, multiple factors may together indicate which specific call-to-action element is more suitable for a given user at a given time and/or location. Thus, suppose that based on the user's calendar, it may be determined that: (1) there is a dinner party held at Johnson BBQ Restaurant; (2) the user has been invited to the dinner party (i.e., the user is an invitee); (3) the user has agreed to attend the party (e.g., the user has RSVP'ed); and (4) the current time when the user requests the search is around the time of the dinner party. All these pieces of information may be combined to determine the ranks of the call-to-action elements for the search result.

As another example, suppose that the user is playing a computer game (e.g., web based or desktop based) with other people. Thus, when the web-based game is a search result, the suitable call-to-action elements that may be associated with the game may include input actions (e.g., designed by the game's developer) that the user may take with the game. Suppose that the game is an interactive game between multiple players (e.g., the players fight against each other). Based on the game scenario, a player may kick or punch an opponent, dodge or block an attack from an opponent, etc. Thus, the call-to-action elements that may be associated with the game may include "kick", "punch", "dodge", and "block". In particular embodiments, the call-to-action elements associated with the web-based game may ranked while taking into consideration the current state of the game with respect to the user. For example, if last action occurred with respect to the user in the game is another player kicking the user, then the "block" call-to-action element may be ranked higher and associated with the game, as under the circumstances, the user is likely to take a defensive action against the attack.

In particular embodiments, the call-to-action associated with a search result may be updated as the circumstances change. In the above example, once the user has clicked on the "block" call-to-action element to block the kick from the other player, the call-to-action element associated with the game may be updated to "kick" so that the user may now make a counter-attack move against the other player.

Different games may have different player actions. For example, a game where players fight against vampires may support various attack moves or actions. Some of these attack actions may work well during daylight while others may work well after dark, since vampires are sensitive to light. Thus, the current time when the search is requested may affect which call-to-action elements are associated with such a game. If the current time is during the day, then one or more actions that work well against the vampires during daylight may be selected to be associated with the game. On the other hand, if the current time is evening or night, then one or more actions that work well against the vampires after dark may be selected to be associated with the game.

In particular embodiments, the available actions supported by a game may be stored on the user's device or obtained from a server (e.g., a server associated with the social-networking system or the game developer). For example, the actions may be downloaded to the user's device if the user chooses to do so. Then, from time to time, as the game is updated and new actions become available, they maybe downloaded to the user's device as needed.

As these examples suggest, by selecting a suitable or appropriate call-to-action element for a search result, it may significantly improve the user's interaction and search experience. For example, by placing a "buy tickets" call-to-action element next to a newly released movie, as described in one of the above examples, the user may buy tickets directly from the search results displayed on the user device. This saves the user the trouble of having to navigate to another website (e.g., a ticket selling website), search for the movie again, and then buy tickets. Similarly, by associating fighting moves with the web-based game, the user may play the game without having to actually go to the game's website.

In particular embodiments, most, if not all, of the relevant information may be incorporated in the graph associated with the social-networking system so that the information is readily available to the search tool for selecting and ranking search results and call-to-action elements. Each information item, big or small, may correspond to a node in the graph, and each relationship between two information item may correspond to an edge in the graph connecting the two corresponding nodes. Thus, the graph not only includes the information items but their relationships as well.

As explained above, sometimes, certain call-to-action elements may be preferred by the provider of the search tool (e.g., the social-networking system), and thus, the ranks of these preferred call-to-action elements may be boosted so that they may be selected over the other call-to-action elements to be associated with the search results. In particular embodiments, when a search result is associated with a call-to-action element preferred by the social-networking system, the rank of this search result may also be boosted so that it is presented to the user before other search results. This may increase the likelihood that the user may select the preferred call-to-action element associated with the search result.

Particular embodiments may present the search results, according to their respective ranks, to the user by display them on the user's device in the order of their ranks, as illustrated in STEP 350.

Sophisticated user devices may have a sufficient amount of storage space for storing various types data. For example, with a smart telephone, some of the user's contacts, calendar appointments, events, task lists, instant messages, emails, news feeds, etc. may be stored on the device. Such information is available even when the device is offline (i.e., disconnected from a network). In particular embodiments, the user may conduct searches with his device regardless of whether the device is online (i.e., connected to a network) or offline. If the device is online when the user requests a search, the search results may be compiled based on information both stored on the user's device as well as information available with the social-networking system and on the Internet. If the device is offline when the user requests a search, the search results may be compiled based only on the information stored on the user's device.

In particular embodiments, the search results are presented to the user (e.g., displayed on the screen of the user's electronic device) as soon as they become available. In addition, the search results may be ranked, and higher-ranked search results may be displayed on the screen of the user's electronic device above the lower-ranked search results. When a higher-ranked search result becomes available after a lower-ranked search result, it may be displayed on the screen of the user's electronic device above the lower-ranked search result, which has already been displayed, by pushing the lower-ranked search result further down on the screen of the user's electronic device.

In some cases, a user may start a search process (e.g., by submitting a search query) while the user's device is offline. However, while the search is being conducted, the device may be connected to a network and come online. In this case, before the device comes online, the search results may be obtained based on information stored locally on the device. After the device comes online, additional search results may be obtained from information available with the social-networking system and on the Internet. The new search results, after they become available, may co-mingle with the existing search results. The rank of each search result may be determined. The presentation of the search results may be adjusted when necessary to incorporate the newly available search results (e.g., inserting some newly available search results above some existing search results on the screen of the user's device).

Sometimes, it may be difficult to describe certain types of search results (e.g., images, videos, etc.) with words. In addition, text entry on mobile hand-held devices can often be cumbersome and time-consuming. Consequently, it may be difficult to formulate sufficiently clear, precise, and descriptive search queries when a user wishes to search for such types of information. For example, there may be millions of images of the White House posted on the Internet. If a user wishes to find images of the White House in a specific style (e.g., from a specific perspective or angle, in a specific setting, etc.), it may be difficult for the user to formulate a search query, in words, to clearly and precisely describe the type of images of the White House the user is searching for. On the other hand, if the user simply uses "white house" as the search query, too many images that are not the type of images the user is looking for may be included as search results, and the user has to filter through all of these, which may be very time consuming.

To further improve the search experiences for the users, particular embodiments may suggest a set of search results to a user as soon as the user accesses the search tool and before the user has submitted any search query to the search tool. These suggested search results may be compiled and ranked based on known information about the user. FIG. 4 illustrates an example method for suggesting a set of search results to a user before the user has provided any search query. Suppose that a user wishes to use a search tool (e.g., a search tool provided by a social-networking system) to find some specific information, such as a telephone number, email address, or other contact information. The user may access the search tool by invoking or executing the search tool on a user device (e.g., a mobile device such as a netbook computer or a mobile telephone), as illustrated in STEP 410. Typically, the search tool provides a user interface, such as user interface 200 illustrated in FIGS. 2A-2C, which may include input field 210 that enables the user to enter and submit search queries and output field 230 for displaying the search results. Executing the search tool on the user device may cause the user interface provided by the search tool to be displayed on the user device.

In particular embodiments, before the user has entered and submitted any search query to the search tool (e.g., via input field 210), and in fact, before the user has typed a single character in input field 210, a set of search results may be compiled for the user based on information already known about the user, as illustrated in STEP 420. In particular embodiments, some of the search results may be associated with appropriate call-to-action elements, which may be selected as described above. As discussed above, the search process may access and present locally stored results prior to or concurrently with obtaining search results from one or more remote sources.

At the time when the user accesses the search tool, there are various types of information already known about the user. For example, the fact that the user has accessed a search tool inherently suggests that the user is looking for some information. Thus, it is an appropriate response to suggest some search results in which the user may be interested to the user. From the user device used by the user, the time when the user accesses the search tool may be determined. In addition, the location of the user device at the time the user accesses the search tool, which means the location of the user, may be determined. For example, if the user device is a mobile telephone, the wireless signal of the telephone may be used to determine the location of the telephone (e.g., by triangulating the signal), and thus of the user. If the user device has a location sensor (e.g., GPS sensor), the sensor data may be used to determine the location of the device, and thus of the user.

Moreover, the identity of the user may be determined (e.g., from the identify of the user device). Consequently, various information about the user may be accessed and analyzed. For example, if the user is a member of the social-networking website, there may be information about the user stored with the social-networking website (e.g., in the user's profile or account settings), such as, for example and without limitation, the user's demographical information, social connections (e.g., families, friends, co-workers, etc.), social calendar and events, hobbies and interests, and so on. In addition, past actions performed by the user (e.g., actions performed in connection with the user device) may be logged and stored, and each action may be associated with a timestamp indicating when that action has been performed and other relevant information. In particular embodiments, these historical actions may be compiled to construct a behavior pattern for the user. For example, the behavior pattern may indicate that the user usually dines out on Thursday evenings, calls his parents on Saturday mornings, takes his child to see movies at a local theatre on Sunday afternoons, and so on. With some implementations, the social-networking website may store all the available information in a graph, such as the one illustrated in FIG. 1. Note that the social-networking website may have many members and the information about all the members may be compiled and stored in the graph.

In particular embodiments, the set of suggested search results may be ranked based on various criteria. In particular embodiments, the ranking of the set of suggested search results, which has been compiled before the user has entered any search query, may differ from the ranking of sets of search results compiled in response to search queries provided by the user. In the set of suggested search results, there may be specific search results, such as photos or videos, that are difficult to rank or discover using text keywords as search queries. In particular embodiments, the ranking of such search results may be increased when they are included in the set of suggested search results (i.e., the set of search results compiled without any search query). On the other hand, when such search results are included in the sets of search results compiled in response to the search queries, their ranking may be relatively lower (e.g., not artificially increased).

In particular embodiments, the known information about a user or users of a social-networking website may be used to construct user models. In some cases, a different model may be constructed for each individual user. The model of a specific user may be constructed based on the known information about that user (e.g., the user's profile, behavior pattern, social connections, etc.) and may reflect characteristics unique to that user. In other cases, a model may be constructed for a group of users (e.g., users belonging to a specific age group, users living in a specific region, users working in a specific field, etc.). The model of a group of users may be constructed based on the known information about all the users belonging to that group and may reflect characteristics common or typical to that group of users (e.g., users of ages between 20 and 30 may prefer pop music or like action movies). Various techniques may be used to construct a model either for a specific user or a group of users, including but not limited to: decision trees, expert systems, word clustering, statistical regressions, probability density, probabilistic automata and other machine learning techniques. These techniques can be a combination of known information about the model and trained information based on feedback from the user and/or users applicable to the model.

In particular embodiments, the known information about the user (e.g., in the form of a user model of the user and/or a user model of a group of users to which the user belongs) may be used to help select a set of search results as suggestions to the user, without any search query being provided by the user. The inputs to the model can include sensor data from a mobile device (e.g., GPS data, cell tower data, accelerometer data, etc.), call logs, as well as the time of the access and the identity of the user. For example, if the time the user accesses the search tool is about 2:00 pm on a Sunday, the movies currently playing at a local theater may be included in the set of search results, as it is possible that the user may wish to select a specific movie for him and his child to attend. If the time the user accesses the search tool is about 6:00 pm on a Thursday, and the location of the user device is in a downtown area, then restaurants within walking distance of the user device may be included in the set of search results, as it is possible that the user may wish to find a restaurant for dinner. If the time the user accesses the search tool is about 10:30 am on a Saturday, the telephone number of the user's parents may be included in the set of search results. In addition, the telephone number may be associated with a call-to-action element (e.g., represented as an icon displayed next to the telephone number) to dial the number so that the user may call his parents with a single action (e.g., tapping the call-to-action icon).

As another example, suppose that, according to the user's social calendar, the user is scheduled to attend an event soon, and the time the user accesses the search tool is about 30 minutes before the start of the event. Information about the event (e.g., location, starting time, driving direction from the user's current location to the location of the event) may be included in the set of search results.

As another example, the user's profile may indicate that the user is very interested in outdoor activities, such as hiking and bicycling. Alternatively, the user's past actions may indicate that the user often visit websites related to outdoor activities. In this case, web pages relating to outdoor activities (e.g., information on hiking trails, bike races, etc.) or advertisements on products relevant to outdoor activities (e.g., hiking boots, backpacks, mountain bikes, etc.) may be included in the set of search results.

In particular embodiments, the set of search results may be ranked based on, for example, the known information about the user, as illustrated in STEP 430. With some implementations, the ranking algorithm used to rank the search results obtained without any search query may differ from the ranking algorithm used to rank the search results obtained in response to a search query as described above. For example, as described above, when ranking search results identified in response to a search query, one factor to consider is the degrees of relevance the search results have with respect to the search query. However, when ranking search results compiled without any search query, the relevancy of the search results to the search query is unlikely to be a factor since there is no search query. Instead, the ranking algorithm may take other factors into consideration.

In particular embodiments, the past actions may provide recency data about the user's actions, which may indicate how recently the user has performed a specific action. As one example, suppose that there are a number of images included in the set of search results compiled for the user, and the recency data indicate that the user has just browsed many images posted online using a web browser (e.g., within the past 10 minutes). In this case, the ranking algorithm may decrease the ranks of the images included in the set of search results, as it may be unlikely that the user wishes to search for more images after having just viewed many images. Conversely, the ranking algorithm may choose to increase the ranks of the images included in the set of search results, as it may be possible that the user has not found the images he is specifically looking for, and thus has decided to search for them using the search tool.

As another example, suppose that there are news stories from news feeds included in the set of search results. If the record of the user's past action indicates that the user has already read a specific news story, that news story may be excluded from the set of search results, or if the news story is still included in the set of search results, the rank of the news story may be lowered. If the user's behavior pattern indicates that the user reads news feeds many times each day, the ranks of the news stories included in the set of search results, especially those that the user has not yet read, may be boosted.

As another example, suppose that the set of search results includes a number of email messages the user has received recently. If the time the user accesses the search tool is on a weekday during normal business hours, then email messages sent by the user's co-workers may be ranked higher than email messages sent by the user's friends. On the other hand, if the time the user accesses the search tool is in the evenings or on weekends, then email messages sent by the user's friends may be ranked higher than email messages sent by the user's co-workers.

The search results may be presented to the user (e.g., displayed inside output field 230 on the user device) according to their respective ranks, as illustrated in STEP 440. In some implementations, as soon as the user accesses the search tool and when the user interface is initially displayed on the user device, the output field included in the user interface has already been populated with the suggested search results. In other words, when the user interface of the search tool is first presented to the user, it already includes the suggested search results compiled and ranked based on the known information about the user. Thereafter, the user has the choice of interacting with any of the presented search results (e.g., as the user normally interacts with a search result identified in response to a search query) or enter a search query in the input field included in the user interface (e.g., when the user does not find the suggested search results useful).

If the user chooses to enter and submit a search query to the search tool, the search tool may compile a new set of search results in response to the search query submitted, as described above in connection with FIG. 3. The new set of search results may be displayed in the output field included in the user interface, replacing the initial set of search results. With some implementations, with the "type ahead" feature supported, as soon as the user starts entering characters of the search query into the input field included in the user interface, the search tool may compile new search results, in response to the characters thus far entered, to replace the initial set of search results.

With some implementations, to provide a consistent search experience to the user, each set of search results, whether it is compiled without a search query (e.g., before the user has submitted any search query) or in response to a search query submitted by the user, is presented in the same or similar format or layout so that multiple sets of search results all have the same or similar look and feel. The user does not need to be concerned with how a set of search results is obtained, and instead, can concentrate on locating the specific search results the user is looking for.

With some implementations, the search tool may take into account the user's behavior using the interface prior to entering any search query to compile a different set of search results once a search query has been entered. For example, a user who scrolls down the list of suggested search results prior to entering a search query has seen different information from a user who immediately begins typing (e.g., without bothering to review any of the suggested search results). The search tool may re-rank, restrict by category, or hide search results that the user who scrolled down the list has seen.

Figure 5:
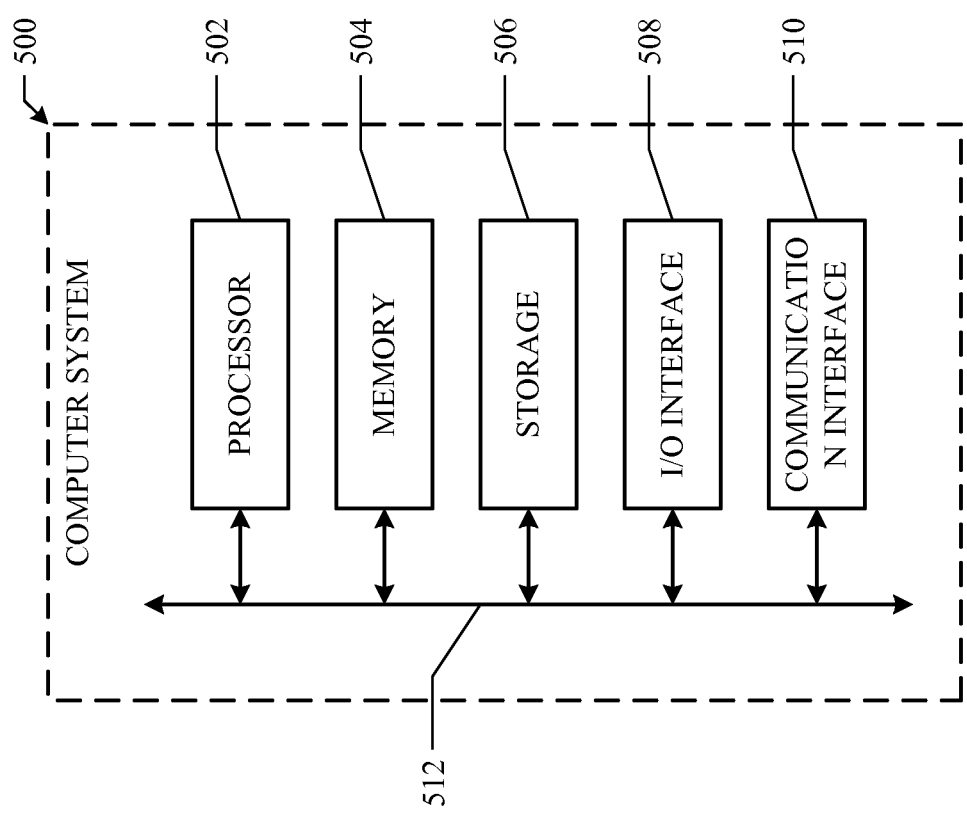
FIG. 5 illustrates an example computer system.

The search tool functionalities (e.g., identifying, ranking, and boosting search results) described above may be implemented as a series of instructions stored on a computer-readable storage medium that, when executed, cause a programmable processor to implement the operations described above. FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more processors associated with a social-networking system of an online social network:
   receiving, from a client device of a user, an indication of the user accessing a search tool at the client device of the user, the indication being received before the user inputs any search query or portion thereof to the search tool, wherein the user is a member of the online social network;
   in response to receiving the indication of the user accessing the search tool, compiling for presentation to the user a set of search results based on information known about the user stored by the social-networking system, the search results being compiled before the user inputs any search query or portion thereof to the search tool, each search result being associated with one or more call-to-action elements applicable to the search result, each call-to-action element being a user-interface element that prompts an action from the user to initiate a particular function or process related to the search result via the social-networking system; and
   sending, to the client device of the user, the set of search results with the call-to-action elements for presentation to the user, wherein the call-to-action elements are presented to the user in proximity to their corresponding search results.

2. The method of claim 1, wherein the information known about the user comprises the user's demographical data, social connections, interests, hobbies, past actions, behavior patterns, and calendar entries.

3. The method of claim 1, wherein the set of search results is compiled further based on a time when the user accesses the search tool.

4. The method of claim 1, wherein the set of search results is compiled further based on a location where the user accesses the search tool.

5. The method of claim 1, further comprising ranking the set of search results based on the information known about the user.

6. The method of claim 1, further comprising for each of one or more search results from the set of search results:
   identifying the one or more call-to-action elements applicable to each search result of the set of search results based on the information known about the user;
   ranking the call-to-action elements based a suitability of the call-to-action element to the search result and further based on at least one relationship in the online social network between the user and another user associated with the search result; and
   presenting the one or more call-to-action elements as ranked with the applicable search result.

7. The method of claim 1, further comprising:
   receiving a search query submitted by the user to the search tool;
   identifying a new set of search results in response to the search query; and
   presenting the new set of search results to the user, replacing the set of search results.

8. The method of claim 1, wherein sending the set of search results comprises:
   associating at least one top-ranked call-to-action element with the search result.

9. The method of claim 1, wherein one of the call-to-action elements corresponds to an action that is likely to be performed by the user with respect to the search result.

10. The method of claim 1, wherein one of the call-to-action elements corresponds to an action that is convenient for the user to perform with respect to the search result.

11. The method of claim 1, wherein one of the call-to-action elements corresponds to an action that the social-networking system encourages the user to perform with respect to the search result.

12. The method of claim 1, further comprising:
   accessing a graph data structure comprising a plurality of nodes and a plurality of edges connecting the nodes, wherein the user corresponds to a first node of the plurality of nodes, and wherein the one or more search results correspond to one or more second nodes, respectively, of the plurality of nodes.

13. A social-networking system of an online social network, the social-networking system comprising: a memory comprising instructions executable by one or more processors; and the one or more processors coupled to the memory and operable to execute the instructions, the one or more processors being operable when executing the instructions to:
   receive, from a client device of a user, an indication of the user accessing a search tool at the client device of the user, the indication being received before the user inputs any search query or portion thereof to the search tool, wherein the user is a member of the online social network;
   in response to receiving the indication of the user accessing the search tool, compile for presentation to the user a set of search results based on information known about the user stored by the social-networking system, the search results being compiled before the user inputs any search query or portion thereof to the search tool, each search result being associated with one or more call-to-action elements applicable to the search result, each call-to-action element being a user-interface element that prompts an action from the user to initiate a particular function or process related to the search result via the social-networking system; and send, to the client device of the user, the set of search results with the call-to-action elements for presentation to the user, wherein the call-to-action elements are presented to the user in proximity to their corresponding search results.

14. The system of claim 13, wherein the information known about the user comprises the user's demographical data, social connections, interests, hobbies, past actions, behavior patterns, and calendar entries.

15. The system of claim 13, wherein the set of search results is compiled further based on a time when the user accesses the search tool.

16. The system of claim 13, wherein the set of search results is compiled further based on a location where the user accesses the search tool.

17. The system of claim 13, wherein the one or more processors are further operable when executing the instructions to rank the set of search results based on the information known about the user.

18. The system of claim 13, wherein the one or more processors are further operable when executing the instructions to, for each of one or more search results from the set of search results:

identify the one or more call-to-action elements applicable to each search result of the set of search results based on the information known about the user;

rank the call-to-action elements based a suitability of the call-to-action element to the search result and further based on at least one relationship in the online social network between the user and another user associated with the search result; and present the one or more call-to-action elements as ranked with the applicable search result.

19. One or more computer-readable non-transitory storage media embodying software operable when executed by a social-networking system of an online social network:

receive, from a client device of a user, an indication of the user accessing a search tool at the client device of the user, the indication being received before the user inputs any search query or portion thereof to the search tool, wherein the user is a member of the online social network;

in response to receiving the indication of the user accessing the search tool, compile for presentation to the user a set of search results based on information known about the user stored by the social-networking system, the search results being compiled before the user inputs any search query or portion thereof to the search tool, each search result being associated with one or more call-to-action elements applicable to the search result, each call-to-action element being a user-interface element that prompts an action from the user to initiate a particular function or process related to the search result via the social-networking system; and send, to the client device of the user, the set of search results with the call-to-action elements for presentation to the user, wherein the call-to-action elements are presented to the user in proximity to their corresponding search results.

* * * * *